(12) United States Patent
Drucker

(10) Patent No.: US 8,082,981 B2
(45) Date of Patent: Dec. 27, 2011

(54) MULTIPLE POINT ADJUSTABLE DEPTH AIR SPARGING WELL SYSTEM

(75) Inventor: Andrew Scott Drucker, Newbury Park, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 349 days.

(21) Appl. No.: 12/494,905

(22) Filed: Jun. 30, 2009

(65) Prior Publication Data

US 2009/0260799 A1  Oct. 22, 2009

Related U.S. Application Data

(63) Continuation-in-part of application No. 12/235,961, filed on Sep. 23, 2008, which is a continuation-in-part of application No. 11/527,659, filed on Sep. 21, 2006, now abandoned.

(51) Int. Cl.
*E21B 33/00* (2006.01)

(52) U.S. Cl. .......... 166/67; 166/387; 166/311; 166/188; 166/370; 405/128.15; 405/128.45; 405/128.7

(58) Field of Classification Search .................. 166/387, 166/311, 188, 242.1, 267, 67, 263, 268, 370; 405/128.25, 128.15, 128.45, 128.5, 128.7, 405/128.75
See application file for complete search history.

(56) References Cited

U.S. PATENT DOCUMENTS 5,879,108 A * 3/1999 Haddad ...................... 210/747.7
6,305,878 B1 * 10/2001 Drucker .................. 405/128.25
\* cited by examiner

*Primary Examiner* — Kenneth L Thompson
*Assistant Examiner* — Sean Andrish
(74) *Attorney, Agent, or Firm* — David S. Kalmbaugh; Christopher L. Blackburn

(57) ABSTRACT

An multiple point adjustable depth air sparging well system having a multiple air injection points for injecting compressed air into saturated or groundwater regions of the soil's subsurface to remove volatile contaminants from the soil's subsurface. At plurality of flow-through air sparge packer which are slidably mounted flow-through packers within the well casing of the air sparging well system allows a user to adjust the depths of the air injection points. Each packer has attached thereto a pressure regulator which provides compressed air to one of the multiple air injection points.

20 Claims, 6 Drawing Sheets

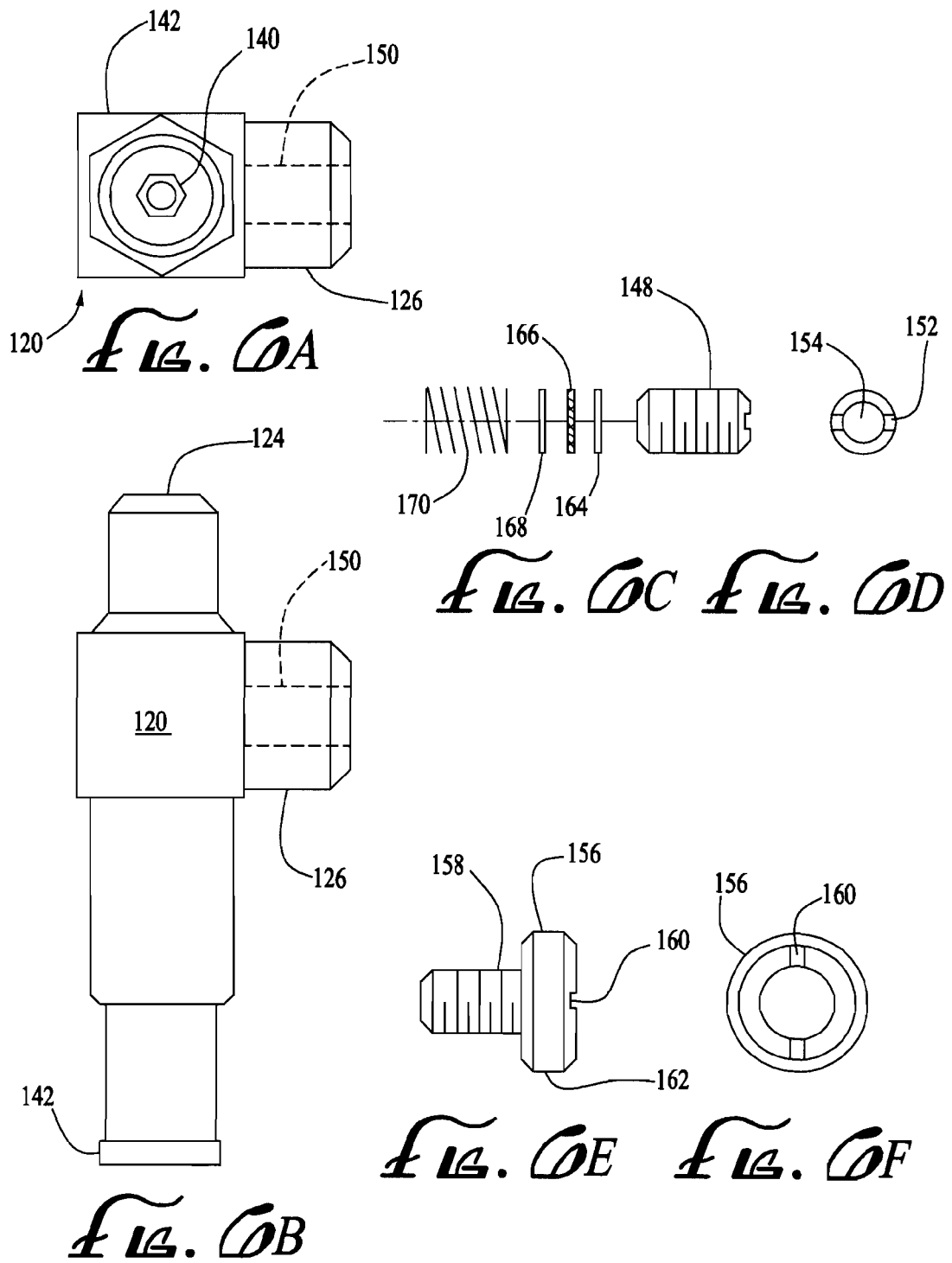

MULTIPLE POINT ADJUSTABLE DEPTH AIR SPARGING WELL SYSTEM

This application is a continuation-in part of U.S. patent application Ser. No. 12/235,961, filed Sep. 23, 2008, which is a continuation-in-part of U.S. patent application Ser. No. 11/527,659, filed Sep. 21, 2006, now abandoned.

BACKGROUND OF THE INVENTION

1. Field of the Invention

The present invention relates generally to a system for removing environmentally harmful volatile contaminants from saturated or groundwater regions of the soil subsurface. More particularly, the present invention relates to a multiple point adjustable depth air sparging system which uses injected air to remove volatile contaminants from saturated or groundwater regions of the soil's subsurface.

2. Description of the Prior Art

Air sparging is a relatively recent and a very innovative environmental remediation technology that uses air injected under pressure to remove environmentally harmful volatile contaminants from a contaminated groundwater zone within the soil's subsurface. Air sparging systems are capable of removing volatile contaminants such as gasoline, certain solvents and jet fuels from the groundwater region of the soil subsurface. In particular, air sparging systems are used to remove residual source contamination, clean up dissolved phase contamination, and contain a migrating contaminant plume.

Injected air strips and converts the contaminants from a liquid phase to a vapor phase and then transports the volatile contaminants via air channels to an unsaturated zone within the soil's subsurface. The extent of the injected air within the remedial zone of air sparging site affects the level of contact with the target contaminants.

U.S. Pat. No. 6,305,878 for an "Adjustable Depth Air Spargimg Well" discloses a flow through packer which is slidably mounted within a well casing allowing for vertical movement of the flow through packer within the well casing. The flow through packer includes an inflatable packer fabricated from inflatable elastomeric tubing, a lower end portion of an air supply tube which has a plurality of openings for providing pressurized air to inflate the packer, and a pair of elastomer/rubber packer end caps. An air compressor/blower is coupled to the air supply tube supplying pressurized air to the inflatable packer which inflates the packer holding the packer at a fixed depth within the well casing. Deflating the inflatable packer allows for vertical movement of the inflatable packer within the well casing. Positioned at the lower end of the air supply tube is a screen pressure regulator through which air under pressure passes to a well screen. The well screen, which comprises the lower portion of the well casing, is mounted in the soil's saturated zone. The pressurized air next passes through the well screen into the soil's saturation zone removing volatile contaminants and transferring the contaminants to the soil's vadoze zone.

While successful in cleaning up contaminated sites, present systems, such as the system of U.S. Pat. No. 6,305,878, use only one discrete depth air sparge well to inject air into the soil's contaminated groundwater zone. Attempts to mechanically adjust air sparge wells with specialized equipment have met with only limited success.

There is a need to increase the level of air distribution by using multiple injection points to vary air injection depths within the soil's contaminated groundwater zone. At least a second point of air injection is required, preferably at a fixed depth to provide additional air flow channels resulting in the removal of all volatile contaminants from the saturated or ground water regions of the soil subsurface being treated.

There is also a need for a user to have the capability to precisely and repeatedly adjust the depth of air injection without the expense of having to install new air sparging wells.

SUMMARY OF THE INVENTION

The multiple adjustable depth air sparging well system comprising the present invention provides for multiple adjustable points of air injection and a second stationary point of air injection to remove all volatile contaminants from the saturated or ground water regions of the soil subsurface being treated. The present invention permits multiple air injection points and adjustability of these injection points to significantly increase the distribution of air an air channels surrounding a single air sparge well casing.

The multiple point adjustable depth air sparging well system requires a source, preferably an air compressor/blower, of pressurized air to supply the air sparging well system for full functionality. A flexible air supply line connects the source of pressurized air to multiple adjustable depth flow-through packers located within the well casing providing pressurized air to the flow-through packers.

The multiple flow-through packers within the well casing are inflatable flow-through packers which slide concentrically through the air sparge well casing.

Each flow-through packer includes a finely meshed screen pressure regulator through which the air under pressure passes to a screened portion of the well casing. The finely meshed screen pressure regulator associated with each flow-through packer is attached to one end of the flow-through packer and removable therefrom. The pressure regulator is a separate component which includes a threaded section for attachment to the flow-through packer and removal from the flow-through packer. The combination of each flow-through packer and its associated pressure regulator forms one of the multiple points of air injection within the well casing.

The air supply line also connects the air compressor/blower to a point of air injection near the bottom of the well casing supplying air under pressure to the this point of air injection. This point of air injection is located below the lowest positioned flow-through packer within the well casing. Positioned at the lower end of this flow-through packer and attached thereto is a bottom in-well screened pressure regulator. This pressure regulator supplies pressurized air to the lowest point of air injection.

The air compressor/blower supplies pressurized air via the flexible air supply line to a well head air supply manifold positioned at the upper end of the well casing for multiple point adjustable depth air sparging well. The manifold is pneumatically sealed using a compression fitting containing a rubber o-ring. The compression fitting prevents pressurized air from escaping into the atmosphere through the well head. In addition, the compression fitting seal serves the purpose of mechanically locking the each of the multiple flow-through packers in place at a pre-selected depths chosen by operator. This prevents vertical movement of the flow-through packers when the air sparging well system is operational.

The pressurized air traveling through each of the flow-through packers within the well casing inflates each of the flow-through packers, sealing each packer against the well casing's internal wall and preventing the injected air from flowing back up the interior of the well casing, which insures that the air flow is through the multiple injection points into the air channels formed within contaminated groundwater zone within the soil's subsurface.

Each of the flow through air sparge packers are designed to have multiple lengths and is available in one foot sections, two and one half foot sections and five foot sections.

The well screen, which comprises the lower portion of the well casing, is mounted in the soil's saturated zone. Pressurized air passes through each of the air sparge packers and then through the pressure regulator's within the well screen into the soil's saturation zone at the multiple injection points removing volatile contaminants and transferring the contaminants to the soil's vadoze zone. The screened pressure regulator is connected to the lower end of the air sparge packer.

Air supplied to the well head manifold flows through the space between an air supply tube, which is connected to the flow-through packer, and an internal surface of the wall casing. The air exits the upper and lower screened portions of the well screen at multiple injection points.

BRIEF DESCRIPTION OF THE DRAWINGS

FIGS. 6A-6D illustrate detailed views of the pressure regulator component of the in-well pressure regulator section of FIG. 5;

FIG. 6E illustrates an embodiment of a round head set screw; and

FIG. 6F illustrates a plan view of the embodiment of a round head set screw of FIG. 6E.

DETAILED DESCRIPTION OF THE PREFERRED EMBODIMENTS

Figure 1:
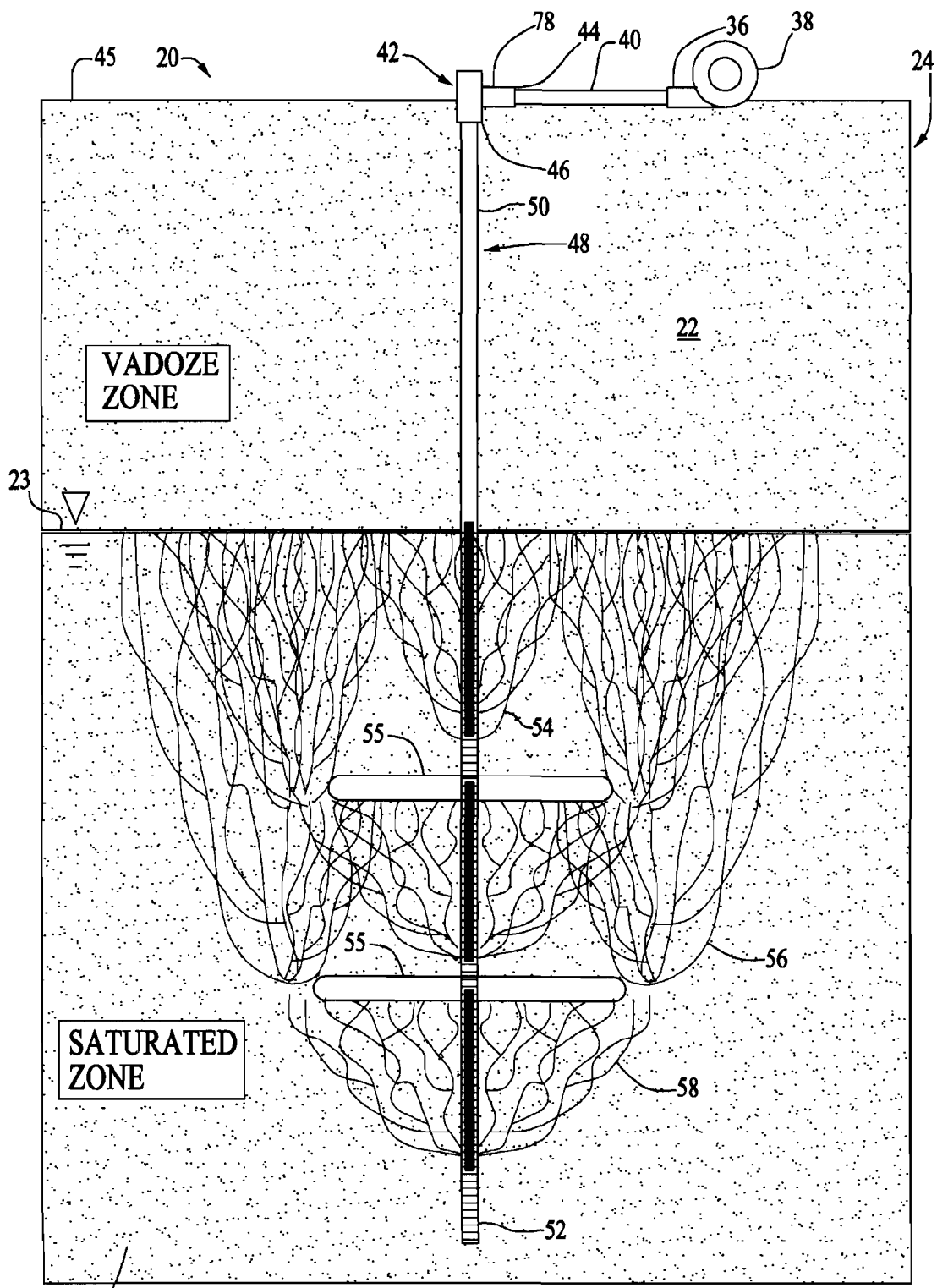
FIG. 1 illustrates a multiple point adjustable depth air sparging well system which has a well head manifold allowing for a sealed stream of air to be injected through the well screen of the well system.
Figure 2:
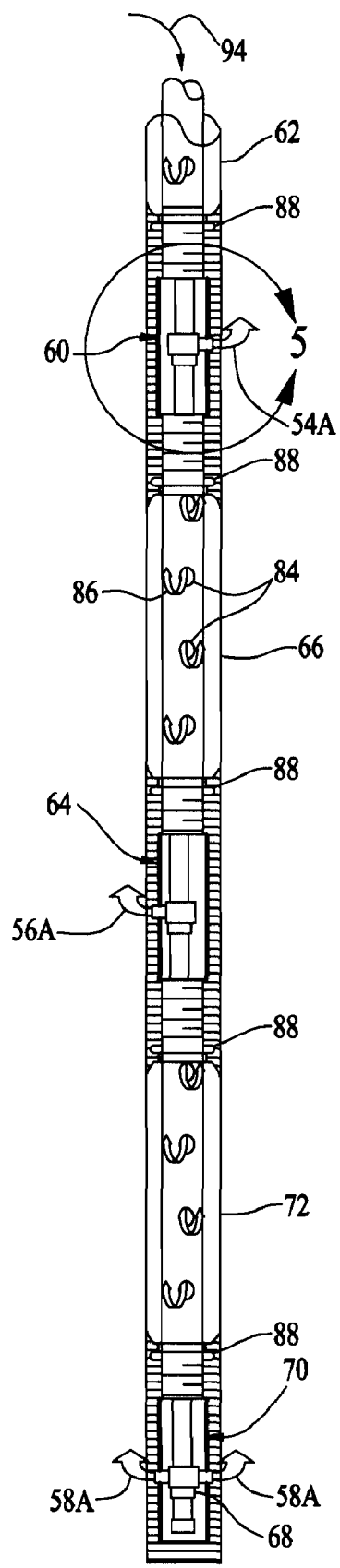
FIG. 2 illustrates a view of the screened well casing section of the upper portion and lower portions of the multiple point adjustable depth air sparging well system of FIG. 1 including a typical air flow pattern within the well screen of the well system of FIG. 1.

Referring to FIGS. 1 and 2, FIGS. 1 and 2 illustrate a preferred embodiment of the multiple point adjustable depth air sparging well system 20 comprising the present invention. The multiple point adjustable depth air sparging well system 20 removes volatile contaminants, such as jet fuel, solvents and industrial contaminants from the saturated or groundwater regions of the soil's subsurface. The multiple point adjustable depth air sparging well system 20 is vertically positioned in the soil 24 in the manner illustrated in FIG. 1 and passes through the vadoze zone 22 of the soil 24 into the saturated or groundwater zone 26 of the soil 24. It should be noted that the saturated zone 26 of the soil 24 is homogeneous except for the confining soil lense. Boundary line or water table 23 indicates where in the soil the boundary between vadoze zone 22 and saturated zone 26 occurs.

An air blower/air compressor 38 supplies pressurized air via an air supply line 40 to a well head air supply manifold 42 positioned at the upper end 50 of the well casing 48 for multiple point adjustable depth air sparging well 20.

As shown in FIG. 1 air supply line 40 connects the air supply port 36 of blower 30 to the air inlet port 44 of manifold 42 to provide a source of compressed air to multiple point adjustable depth air sparging well system 20. Well head air supply manifold 42 has air inlet port 44 and an air outlet port 46. Air outlet port 46 of manifold 44 is connected to the upper portion 50 of the well casing 48. The lower end or lower portion of the well casing 48 is fully screened and the screened portion of well casing 48 is identified by the reference numeral 52. The lower end or screened portion 52 of the well casing 48 is positioned within the saturated zone 26 of soil 24.

The soil's saturated zone 26 has a plurality of soil lenses/stratified layers 55. Pressurized air provided by air compressor/blower 38 flows through the screened portion 52 of the well casing 48 creating three distinct sets of air flow channels 54, 56 and 58 within the soil's saturated or groundwater zone 26. As shown in FIG. 1, the air channels 54, 56 and 58 are generated by multiple point adjustable depth air sparging well system 20 above and below the soil lenses 55 to more effectively remove environmentally harmful volatile contaminants from saturated or groundwater regions 26 of the soil subsurface.

Referring to FIGS. 1, and 2, FIG. 2 illustrates a multiple point adjustable depth air sparging well system 20 to produce the three distinct sets of air flow channels 54, 56 and 58 within the soil's saturated or groundwater zone 26. An in-well pressure regulator section 60 which is attached to the bottom end of an air sparge flow-through packer 62 produces the first set of air flow channels 54 Pressurized air flow from pressure regulator section 60 passes through the screened portion 52 of the well casing 48 in the manner depicted by arrow 54A. The pressurized air then flows through air channels 54 removing volatile contaminants from the upper portion of the soil's saturated zone 26.

An in-well pressure regulator section 64 which is attached to the bottom end of an air sparge flow-through packer 66 produces the second set of air flow channels 56. Pressurized air flow from pressure regulator section 64 passes through the screened portion 52 of the well casing 48 in the manner depicted by arrow 56A. The pressurized air then flows through air channels 54 removing volatile contaminants from the middle portion of the soil's saturated zone 26.

A bottom in-well pressure regulator section 68 is attached to the bottom end of an air sparge flow-through packer 72 produces the third set of air flow channels 58. Pressurized air flow from pressure regulator section 68 passes through the screened portion 52 of the well casing 48 in the manner depicted by arrow 58A. The pressurized air then flows through air channels 58 removing volatile contaminants from the lower portion of the soil's saturated zone 26.

The air stream represented by arrow 94 (FIGS. 2 and 4) is supplied to the in-well pressure regulator sections 60, 64 and 68 which produce air channels 54, 56 and 58, respectively. Blower/air compressor 38 is capable of supplying pressurized air at flow rates of between 5 scfm and 40 scfm to and well screen 52 which is that portion of a well casing 48 extending into the soil's saturated zone 26. As shown in FIG. 1 the well screen portion 52 of the well casing 48 extends downward in the saturated zone 26 of the soil 24 from slightly below the water line 23 to the lower portion of the saturated zone 26 of the soil 24.

Blower/air compressor 38 is also capable of supplying pressurized air at flow rates of between 5 scfm and 40 scfm. The compressed air passes through the screened portion 52 at the injection points 54, 56 and 58 in the manner illustrated in FIG. 1.

Figure 3:
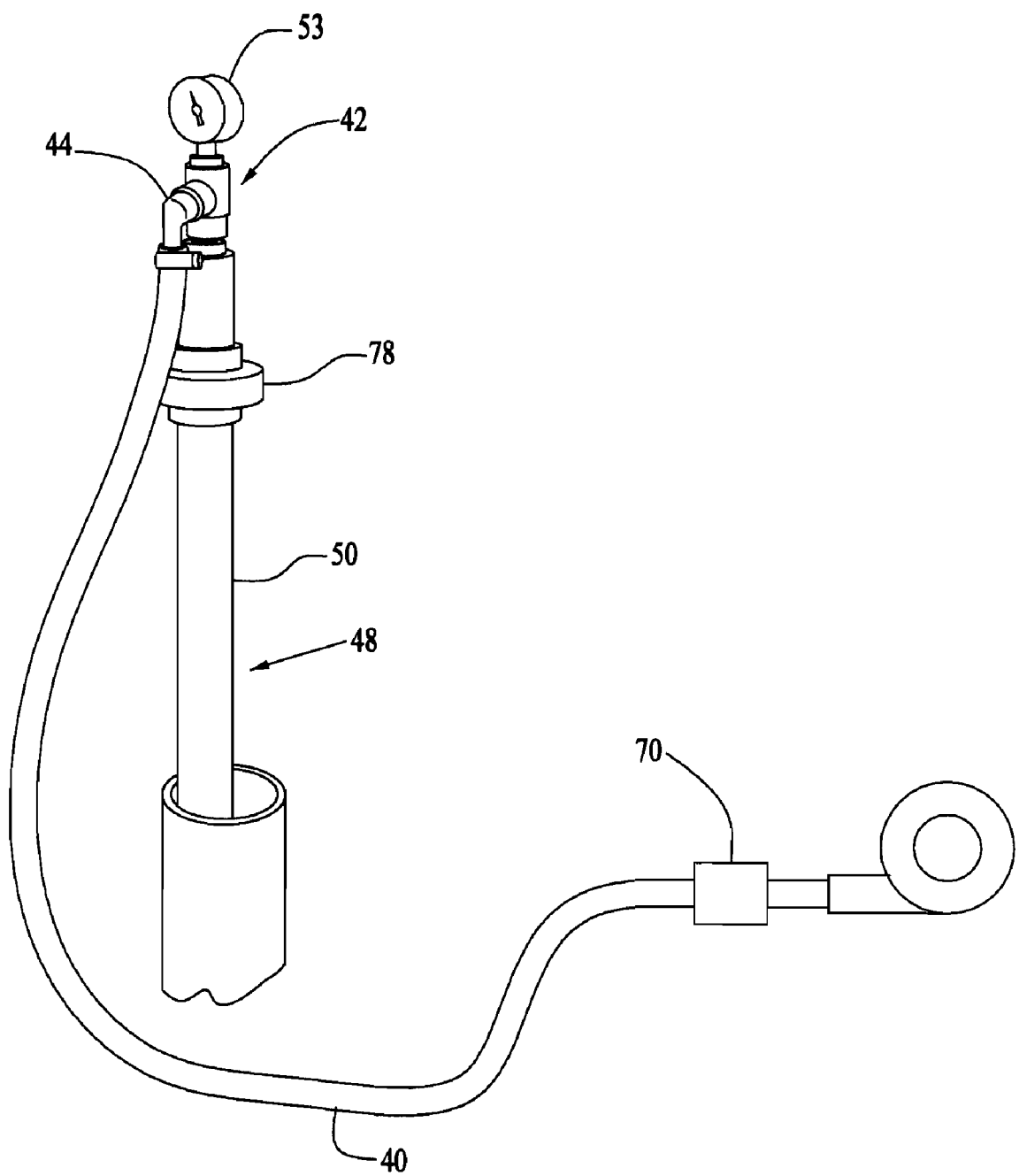
FIG. 3 is a detailed view in section illustrating the flow through air sparge packer for the multiple point adjustable depth air sparging well of FIG. 1.

A pressure gauge 53 (FIG. 3) monitors air pressure through air supply line 40 and well head air supply manifold 42. Pressure gauge 53 (FIG. 3) may be any conventional and commercially available air pressure gauge which monitors air pressure through an air supply line. Further, as shown in FIG. 3, air supply line 40 includes a check valve 70 which is portioned between blower/air compressor 38 and the air inlet port 44 of manifold 42. The check valve 70 used in the preferred embodiment is a conventional two port mechanical valve which allows for one directional fluid flow from blower/air compressor 38 through the valve 70 to the in-well pressure regulator sections 60, 64 and 68 within well casing 48 producing air channels 54, 56 and 58.

Located at the upper end of multiple point adjustable depth air sparging well system 20 is the well head air supply manifold 42. The well head manifold 42 has a compression fitting seal and packer lock mechanism 78. Well head manifold 42, which contains a rubber O-ring, secures the flexible air supply tube 40 to the air inlet port 44 for the air sparging well system 20. The rubber O-ring prevents leakage of compressed air back into the atmosphere through the well head. In addition, the compression fitting seal and packer lock mechanism 78 allows a user of air sparging well system 20 to mechanically lock the flow-through packers 62, 66 and 72 in place at a pre-selected depth within the saturated zone 26, which is chosen by the user. This prevents vertical movement of the flow-through packer 62, 66 and 72 when the air sparging well system 20 is operational.

Figure 4:
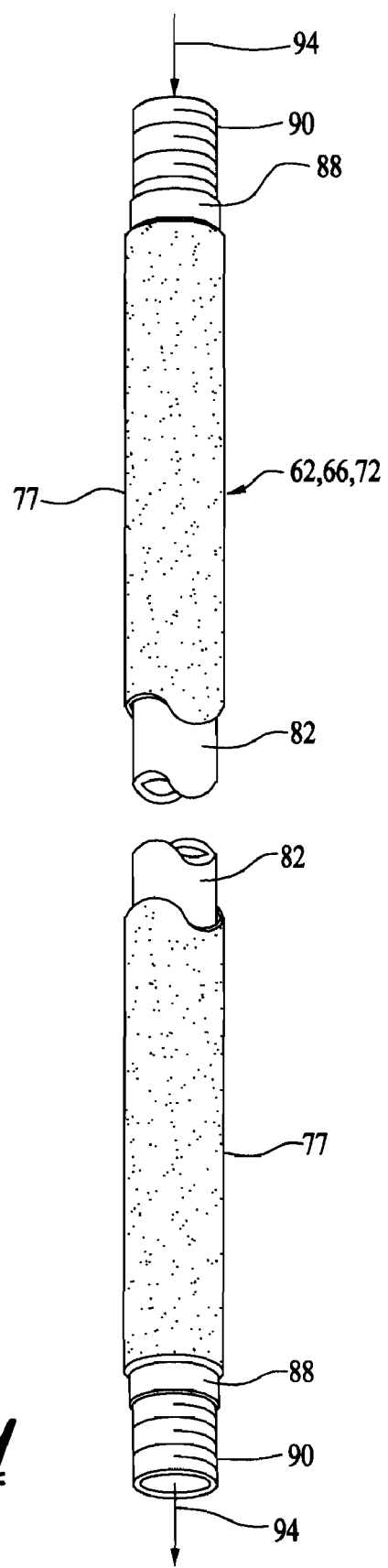
FIG. 4 is a detailed view in section illustrating one of the flow-through air sparge packers used in the screen portion of the well casing of the multiple point adjustable depth air sparging well system of FIG. 1.

Referring to FIGS. 1, 2, and 4 each of the flow-through air sparge packers 62, 66 and 72 is slidably mounted or positioned within well casing 48 allowing for vertical movement and positioning by the user of flow-through air sparge packer 62, 66 and 72 within well casing 48. As shown in FIG. 1 well casing 48 extends from the soil's surface 45 through the vadoze zone 22 and the water table 23 into the upper, middle and lower portions of the soil's saturated zone 26 from which volatile contaminants are to be removed. A substantial portion of the well casing 48 extending into the saturated zone 26 is fully screened (as represented by the reference numeral 52). This allows for multiple injection points, which are represented by arrows 54A, 56A and 58A (FIG. 2) at different depths in the saturated zone 26 of the soil 24 with positioning of the air sparge packers 62, 66 and 72 within the well screen 52 of the well casing 48 determining the actual depth at which air injection (as represented by arrow 94) occurs.

Referring to FIGS. 1, 2 and 3 compressed air flows through the air supply line 40 in the manner represented by arrow 94. The compressed air flows from the air blower/air compressor 38 through air supply line 40 and then through the air sparge flow-through packers 62, 66 and 72 exiting the well screen 52 of well casing 48 at the three injection points represented by arrows 54A, 56A and 58A into the saturated zone 26 of the soil 24.

Figure 5:
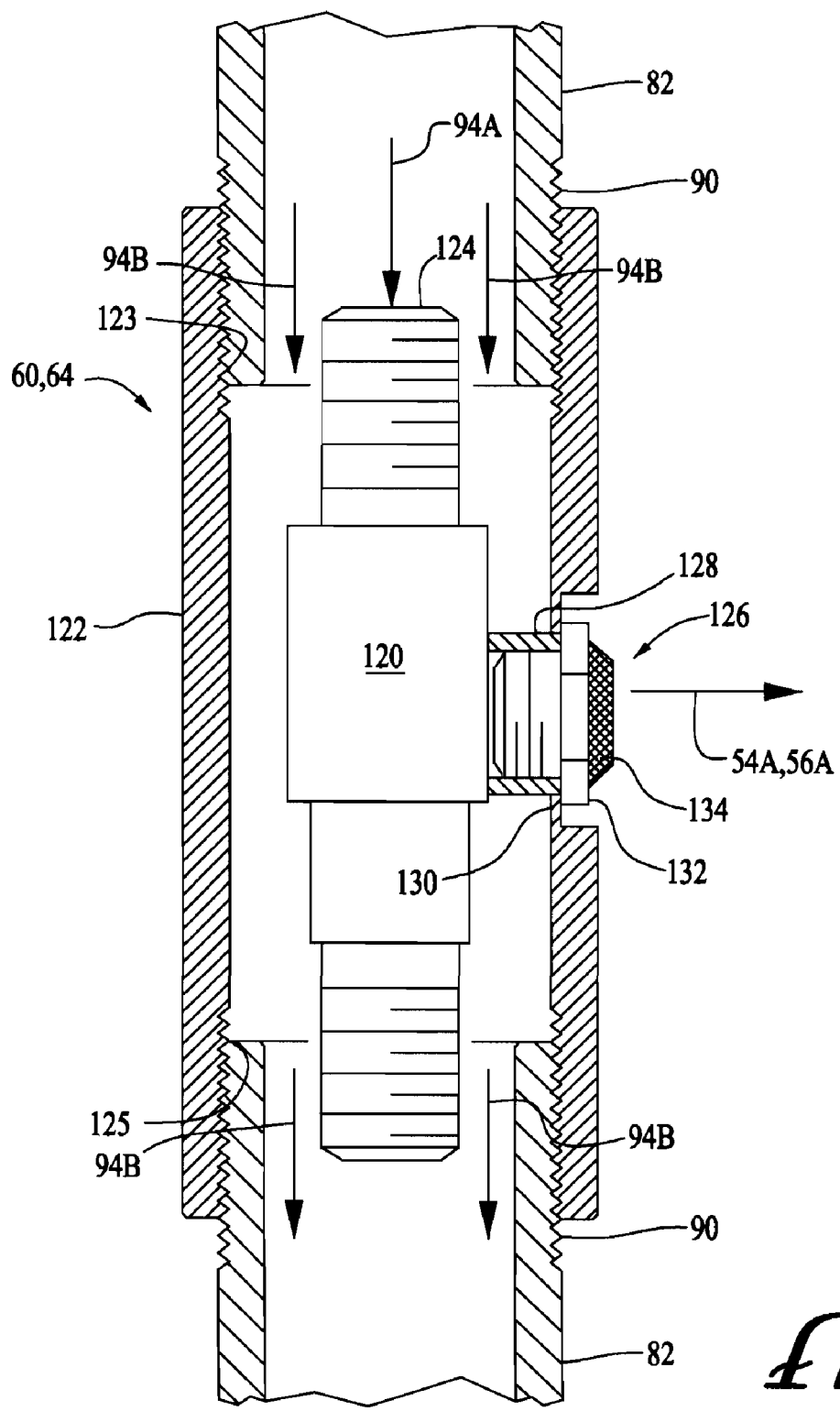
FIG. 5 illustrates a detailed view in section of a first embodiment of the in-well pressure regulator section of FIG. 2.

Referring to FIGS. 2, and 5, there is shown in FIG. 5 a detailed view of each of the in-well pressure regulator sections 60 and 64 of FIG. 2 which provide air under pressure to the soil's saturated zone 26 to remove volatile contaminants from the soil's groundwater.

Each of the in-well pressure regulator sections 60 and 64 includes a pressure regulator 120 vertically positioned within a pressure regulator housing 122 in the manner shown in FIG. 5. The regulator housing 122 is fabricated from schedule 80 stainless steel or galvanized pipe and is designed to hold the pressure regulator 120 in a fixed vertically orientated position within the housing 120.

At this time it should be noted that the pressure regulator's used in the preferred embodiment are port mounted regulators commercially available from AIRman Corporation of Wixom, Mich.

Air pressure entering the housing 122 from either flow-through packer 62 or 66 is approximately 20 psi (represented by arrows 94A and 94B). A portion of the pressurized air flows through the housing (represented by arrows 94B) to the next flow-through packer within the well casing 48 for multiple point adjustable depth air sparging well 20. Air pressure of the compressed air entering the housing 122 is set at 20 psi. This air pressure of 20 psi is required to inflate and maintain inflation of the flow-through packers 64, 66 an 72.

Each of the pressure regulators 120 provides for a pressure drop of approximately 10 psi, that is air under pressure enters the air inlet port 124 of regulator 120 at 20 psi exiting the air outlet port 126 of regulator 120 at 10 psi (as represented by the arrow 54A, 56A).

Pressure housing 122 has a centerally located opening 128 which is used to mount and secure the pressure regulator 120 within housing 122. The air outlet port 126 of pressure regulator 120 is press fit into the lip 130 of opening 126. A nut 132 is then used to secure the air outlet port 126 to the housing 122. The air outlet port 126 also has a finely meshed screen 134 through which pressurized air exits the pressure regulator 120. The finely meshed screen 134 prevents small particles of dirt and other contaminants from reentering the pressure regulator 120 which can disrupt air flow from the pressure regulator 120 and cause severe damage to the pressure regulator 120. Each of the pressure regulators within the multiple point adjustable depth air sparging well system 20 has a finely meshed screen in its air outlet port including the pressure regulator 68 positioned at the lower end of the screened portion 52 of the well casing 48.

Referring to FIGS. 6A and 6B, there is a pressure adjustment mechanism 140 located at the lower end of each of the pressure regulator 120. The pressure adjustment mechanism 140 for each pressure regulator 120 allows the user to adjust the pressure such that the pressure regulator 120 provides compressed air at outlet port 126 of 20 psi when the pressure entering the regulator 120 at its inlet port 124 is approximately 10 psi.

Referring to FIGS. 6C and 6D, FIGS. 6C and 6D depict a slotted headless set screw 148 which is screwed into a threaded opening 150 within the air outlet port 126 of regulator 120 using a blade screw driver. The set screw 148 has a slot adapted to receive the blade screw driver and an opening 154 through which compressed air passes. On the back end of the set screw 148 is the combination of a washer 164, a screen 166, another washer 168 and a spring 170. This combination operates as filter allowing compressed air to pass through the opening 154 into the soil's saturation zone 26 while preventing soil and other contaminants from entering the pressure regulator 120. The opening 154 within set screw 148 can also be filled with a porous foam or sintered metal.

Referring to FIGS. 6E and 6F, FIGS. 6E and 6F depict a round head set screw 156 which has a threaded portion 158 and a slot 160 within the head 162 of the set screw 156. The slot 160 is adapted to receive a blade screw driver and allows the user to screw the threaded portion 158 of set screw 156 into the opening 150 within the air outlet port 126 of regulator 120. With reference to FIGS. 6A and 6B, air outlet port 126 also has opening through which compressed air passes.

Referring to FIGS. 2 and 4, FIG. 4 illustrates an embodiment of the flow-through air sparge packers 62, 66 and 72 comprising an inflatable packer 77 fabricated from an inflatable elastomeric tubing, and a centrally located air supply tube 82 positioned within the interior of the inflatable packer 77. As shown in FIG. 2, air supply tube 82 has a plurality of openings 84 through which compressed air passes to inflate the elastomeric tubing 77.

When air under pressure passes through openings 84 (in the manner indicated by arrows 86) the outer surface of inflatable packer 77 presses against the inner surface of the well screen 52 of the well casing 48 which holds adjustable depth flow-through air sparge packers 62, 66 and 72 in a fixed position within the well casing 48. When inflatable packer 62, 66 or 72 is not under pressure, inflatable packer 62, 66 or 72 deflates which allows for vertical movement of flow-through air sparge packer 62, 66 or 72 within the well screen 52 of well casing 48. When inflatable packer 62, 66 or 72 is inflated (in the manner shown in FIG. 2) a seal is formed which causes the compressed air to exit well screen 52 of the well casing 48 at the injection points (represented by arrows 54A, 56A and 58A). This also prevents injected air from reentering the well screen 52 of the well casing 48 and subsequently short circuiting air flow through the contaminated regions of the soil's saturation zone 26.

As shown in FIG. 4, each end of the air supply tube 82 of each air sparge flow-through packer 62, 66 and 72 is threaded with male threads 90. The male threads 90 are adapted to engage the female threads 125 of the each of the in-well pressure regulator sections 60 and 64 of FIG. 2. Threading the packer ends allows a user to secure each of the flow-through packers 62, 66 and 72 to an associated one of the in-well pressure regulator sections 60 or 66 and easily remove the flow-through packer 62, 66 or 72 from its associated one of the in-well pressure regulator sections 60 or 66.

The bottom in-well pressure regulator section 68 are also threaded allowing for quick attachment to and removal of the regulator section 68 from the lower end threaded portion 90 of air supply tube 82 for flow-through packer 72. The air supply tube may be fabricated from PVC (polyvinyl chloride) pipe or other plastic pipe.

Each end of the flow-through packer 62, 66 and 72 has a metal clamp 88 for securing each end of the elastomeric material 77 to the air supply tube 82 in the manner illustrated in FIG. 4. The metal clamp 88 positioned at each end of the air supply tube 82 may be a stainless steel clamp or a stainless steel strapping.

As an alternative, stainless steel wire wound around the exterior of the inflatable packer 77 at each end of the flow-through packer 77 secures the inflatable packer 77 to an associated end of the air supply tube 82. An elastomeric cover may be positioned over the wound wire to cover the wire.

In a preferred embodiment the air sparge packers 62, 66 and 72 can have multiple lengths of one foot, two and one half feet and five feet. This allows the user to adjust the depth of the injection points (represented by arrows 54A, 56A and 58A, FIG. 2) by selecting for use the air sparge packers having a length which corresponds to the depth below the soil's vadoze zone 22 at which the injection point 54A, 56A and 58A are to be located.

It should be understood that the air sparge packer 54 can be designed to meet user requirements. For example, if the user needs a four foot length or a six foot length air sparge, the unique design of the air sparge packers 62, and 72 of FIG. 4 allows for these lengths.

With lengths of the air sparge packer being available for use in one foot increments, the user can locate the injection points at any depth within the soil's saturation zone 26 the user desires.

At this time it should be noted that flow through packer air supply tube 82 for each packer 62, 66 and 72 has an outside diameter of approximately 0.5-1.0 inches, while well casing 48 has an inside diameter of approximately 1.0-2.5 inches.

Referring to FIG. 2, attached to the lower end of flow through packer air supply tube 52 is screened pressure regulator 68. The screened pressure regulator 68 has a pressure regulator screen fitted to the regulator's exit ports to prevent sediment from entering the flow-through packer 72. Air under pressure passes through the pressure regulator 68. The pressurized air next passes through well screen 52 (also depicted by arrows 58A) into the soil's saturated zone 26.

As the elastomeric tubing inflates, pressure within inflatable packers 62, 66 and 72 rises until pore and hydrostatic pressures associated with the injection depth of adjustable depth air sparging well 20 are overcome. Once these pressures are overcome, pressurized air flows out the screened pressure regulators 60, 64 and 68 through well screen 52 into the contaminated aquifer or saturated zone 26. Air flow within saturated zone 26 is depicted in FIG. 1 as being through air channels 54, 56 an 58. Pressurized air which passes through the well screen 52 of well casing 48 into the soil's saturation zone 22 removes volatile contaminants from saturation zone 26 and transfers the contaminants to the soil's vadoze zone 22.

Referring to FIGS. 1 and 4, FIG. 4 illustrates an air flow pattern of sparged air as it exits the injection points 54, 56 and 58. The first stationary injection point 54 is typically positioned at a shallow depth to allow the user to place multiple flow-through packer 66 and 72 and pressure regulators 64 and 68 at a greater range of injection depths within the soil's saturation zone 26. Injecting compressed air in the soil at a shallow depth (as represented by arrow 54A) results in the generation of air flow channels 54 within the soil 24. This injection point (represented by arrow 54A, FIG. 2) has the advantage of stripping a significant portion of volatile Non-aqueous phase contaminants from the saturated region 26 that tend to reside at or just below the water table. Applying three or more points of injection through a single air sparging well system 20 significantly improves the overall cleanup process and the speed at which it occurs.

From the foregoing, it is readily apparent that the present invention comprises a new, unique, and exceedingly useful multiple point adjustable depth air sparging well for removing volatile contaminants from saturated and groundwater regions of the soil which constitutes a considerable improvement over commercially available air sparging system which do not allow for depth adjustment of the system.

What is claimed is:

1. A multiple point adjustable depth air sparging system for removing volatile contaminants from a saturated zone within a soil subsurface comprising:
   (a) a vertically oriented well casing extending downward into the saturated zone within the soil subsurface, said well casing having a screened portion at a lower end thereof positioned within the saturated zone of the soil subsurface;
   (b) a blower having an outlet port, said blower generating pressurized air for said adjustable depth air sparging system;
   (c) a plurality of air sparge flow-through packers slidably mounted and vertically positioned in the screened portion of said well case, wherein each of said plurality of air sparge flow-through packers includes an inflatable elastomeric material covering said air sparge flow-through packer, the elastomeric material for each of said air sparge flow-through packers when inflated locking said air sparge flow-through packers locking said air sparge flow-through packer in a fixed position within the well casing when inflatable elastomeric material is inflated;

(d) an air supply line having one end connected to an outlet port of said blower, said air supply line extending downward into said well casing, said air supply line being centrally located within an interior of said well casing, said air supply line having have an opposite end connected to one of said plurality of air sparge flow-through packers positioned at an upper end of the screened portion of said well casing, said air supply line providing pressurized air to each of said air sparge flow-through packers to inflate each of said air sparge flow-through packers;

(e) a plurality of pressure regulators positioned within the screened portion of said well casing at a plurality of pre-selected depths, each of said plurality of pressure regulators injecting said pressurized air from said blower through the screened portion of said well casing into said saturated zone at one of said plurality of pre-selected depths, wherein said plurality of pressure regulators form air channels at said pre-selected depths through which said pressurized air injected into said saturated zone flows to remove said volatile contaminants from said saturated zone; and (f) each of said plurality of pressure regulators being connected to a lower end of an associated one of said plurality of air sparge flow-through packers to receive said pressurized air from said associated one of the air sparge flow-through packers and maintain said pressure regulator at said pre-selected depth within the saturated zone when said associated one of the air sparge flow-through packers is inflated.

2. The multiple point adjustable depth air sparging system of claim 1 wherein said blower comprises an air compressor which generates said pressurized air at a pressure of approximately 20 psi.

3. The multiple point adjustable depth air sparging system of claim 2 wherein said air compressor has an air outlet port, the air outlet port of said air compressor being connected to a check valve which is a two port mechanical valve allowing for one directional fluid flow from said air compressor through said check valve to said pressure regulators within the screened portion of said well casing producing said air channels within the soil subsurface.

4. The multiple point adjustable depth air sparging system of claim 1 wherein each of said pressure regulators reduces pressure of said pressurized air from approximately 20 psi to approximately 10 psi and then injects said pressurized air into the saturated zone within the soil subsurface at said pressure of approximately 10 psi.

5. The multiple point adjustable depth air sparging system of claim 1 wherein each of said air sparge flow-through packers comprising an inflatable packer fabricated from said inflatable elastomeric material, and an elongated air supply tube positioned within an interior of said inflatable packer, said air supply tube having a plurality of openings through which said pressurized air passes to inflate the elastomeric material for each said air sparge flow-through packers.

6. The multiple point adjustable depth air sparging system of claim 5 wherein a metal clamp is positioned at each end of said air supply tube to secure said inflatable elastomeric material to said air supply tube, said metal clamp comprising a stainless steel clamp or a stainless steel strapping.

7. The multiple point adjustable depth air sparging packer system of claim 5 wherein the inflatable elastomeric material of said air sparge flow-through packer is fabricated from an inflatable rubber or elastomeric tubing wherein air under pressure passing through said openings causes an outer surface of said inflatable elastomeric material to press against the an inner surface of the screened portion of said well casing which holds said air sparge flow-through air sparge packers in said fixed position within said well casing.

8. The multiple point adjustable depth air sparging system of claim 1 wherein said air sparge flow-through packers each comprise multiple lengths for adjusting a position and depth of each of said pressure regulators within the screened portion of said well casing, each of said flow-through air sparge packers having a length of one foot, two and one half feet or five feet.

9. The multiple point adjustable depth air sparging system of claim 1 wherein said air supply line includes a well head air supply manifold positioned at an upper end of the well casing for said multiple point adjustable depth air sparging system and a pressure gauge connected to said well head air supply manifold to monitor air pressure within said air supply line and said well head air supply manifold.

10. A multiple point adjustable depth air sparging system for removing volatile contaminants from a saturated zone within a soil subsurface comprising:

(a) a vertically oriented well casing extending downward into the saturated zone within the soil subsurface, said well casing having a screened portion at a lower end thereof, wherein the screened portion of said well casing is positioned within the saturated zone of the soil subsurface;

(b) a blower having an outlet port, said blower generating pressurized air for said adjustable depth air sparging system;

(c) a plurality of air sparge flow-through packers slidably mounted and vertically positioned in the screened portion of said well case, wherein each of said plurality of air sparge flow-through packers includes:

(i) an inflatable elastomeric material covering said air sparge flow-through packer, the elastomeric material for each of said air sparge flow-through packers locking said air sparge flow-through packer in a fixed position within the well casing when inflatable elastomeric material is inflated;

(ii) an elongated air supply tube positioned within an interior of said air sparge flow-through packer, said air supply tube having a plurality of openings through which said pressurized air passes to inflate said elastomeric material for each said air sparge flow-through packer, wherein said elongated air supply tube for each of said air sparge flow-through packers has a length of one foot, two and one half feet or five feet; and (iii) a metal clamp positioned at each end of said air supply tube to secure said inflatable elastomeric material to said air supply tube, said metal clamp comprising a stainless steel clamp or a stainless steel strapping;

(d) an air supply line having one end connected to the outlet port of said blower, said air supply line extending downward into said well casing, said air supply line being centrally located within an interior of said well casing, said air supply line having have an opposite end connected to one of said air sparge flow-through packers positioned at an upper end of the screened portion of said well casing, said air supply line providing said pressurized air to each of said air sparge flow-through packers to inflate each of said air sparge flow-through packers;

(e) a plurality of pressure regulators positioned within the screened portion of said well casing at a plurality of pre-selected depths, each of said plurality of pressure regulators having an air outlet port for injecting said pressurized air from said blower through the screened portion of said well casing into said saturated zone at one of said plurality of pre-selected depths, wherein said plurality of pressure regulators form air channels at said pre-selected depths through which said pressurized air injected into said saturated zone flows to remove said volatile contaminants from said saturated zone; and (f) each of said plurality of pressure regulators including:
  (i) a pressure regulator housing wherein said pressure regulator is mounted within said pressure regulator housing in a fixed vertically orientated position;
  (ii) a centrally located opening within said pressure regulator housing, said opening being adapted to receive the air outlet port for said pressure regulator, wherein the air outlet port for said pressure regulator is press fit within said opening and secured thereto;
  (iii) a finely meshed screen positioned within the air outlet port for said pressure regulator through which said pressurized air exits said pressure regulator, said finely meshed screen preventing small particles of dirt and other contaminants from reentering said pressure regulator disrupting air flow from the pressure regulator and causing damage to said pressure regulator; and
  (iv) each of said pressure regulators being connected to a lower end of an associated one said plurality of air sparge flow-through packers to receive said pressurized air from said associated one of the air sparge flow-through packers and maintain said pressure regulator at said pre-selected depth within the saturated zone when said associated one of the air sparge flow-through packers is inflated.

11. The multiple point adjustable depth air sparging system of claim 10 wherein said pressure regulator housing is fabricated from schedule 80 stainless steel pipe or galvanized pipe.

12. The multiple point adjustable depth air sparging system of claim 10 wherein said blower comprises an air compressor which generates said pressurized air at a pressure of approximately 20 psi.

13. The multiple point adjustable depth air sparging system of claim 12 wherein said air compressor has an air outlet port, the air outlet port of said air compressor being connected to a check valve which is a two port mechanical valve allowing for one directional fluid flow from said air compressor through said check valve to said pressure regulators within the screened portion of said well casing producing said air channels within the soil subsurface.

14. The multiple point adjustable depth air sparging system of claim 10 wherein each of said pressure regulators reduces pressure of said pressurized air from approximately 20 psi to approximately 10 psi and then injects said pressurized air into the saturated zone within the soil subsurface at said pressure of approximately 10 psi.

15. The multiple point adjustable depth air sparging system of claim 10 wherein the air outlet port for each of said pressure regulators includes:

(a) a slotted threaded headless set screw which is screwed into a threaded opening within the air outlet port for each of said pressure regulators;

(b) a first washer positioned between said slotted threaded headless set screw and said finely meshed screen within the air outlet port for each of said pressure regulators;

(c) a second washer positioned behind said finely meshed screen within the air outlet port for each of said pressure regulators; and (d) a spring positioned behind said second washer within the air outlet port for each of said pressure regulators.

16. The multiple point adjustable depth air sparging system of claim 10 wherein said air supply line includes a well head air supply manifold positioned at an upper end of the well casing for a multiple point adjustable depth air sparging system and a pressure gauge connected to said well head air supply manifold to monitor air pressure within said air supply line and said well head air supply manifold.

17. A multiple point adjustable depth air sparging system for removing volatile contaminants from a saturated zone within a soil subsurface comprising:

(a) a vertically oriented well casing extending downward into the saturated zone within the soil subsurface, said well casing having a screened portion at a lower end thereof, wherein the screened portion of said well casing is positioned within the saturated zone of the soil subsurface;

(b) an air compressor having an outlet port, said air compressor generating pressurized air for said adjustable depth air sparging system at a pressure of approximately 20 psi;

(c) a plurality of air sparge flow-through packers slidably mounted and vertically positioned in the screened portion of said well case, wherein each of said plurality of air sparge flow-through packers includes:
  (i) an inflatable elastomeric material covering said air sparge flow-through packer, the elastomeric material for each of said air sparge flow-through packers locking said air sparge flow-through packer in a fixed position within the well casing when inflatable elastomeric material is inflated;
  (ii) an elongated air supply tube positioned within an interior of said air sparge flow-through packer, said air supply tube having a plurality of openings through which said pressurized air passes to inflate said elastomeric material for each said air sparge flow-through packer, wherein said elongated air supply tube for each of said air sparge flow-through packers has a length of one foot, two and one half feet or five feet; and
  (iii) a metal clamp positioned at each end of said air supply tube to secure said inflatable elastomeric material to said air supply tube, said metal clamp comprising a stainless steel clamp or a stainless steel strapping;

(d) an air supply line having one end connected to the outlet port of said air compressor, said air supply line extending downward into said well casing, said air supply line being centrally located within an interior of said well casing, said air supply have an opposite end connected to one of said air sparge flow-through packers positioned at an upper end of the screened portion of said well casing, said air supply line providing said pressurized air to each of said air sparge flow-through packers to inflate each of said air sparge flow-through packers;

(e) said air supply line having a well head air supply manifold positioned at the upper end of the well casing for said multiple point adjustable depth air sparging well and a pressure gauge connected to said well head air supply manifold to monitor air pressure within said air supply line and said well head air supply manifold;

(f) a plurality of pressure regulators positioned within the screened portion of said well casing at a plurality of pre-selected depths, each of said plurality of pressure regulators having an air outlet port for injecting said pressurized air from said blower through the screened portion of said well casing into said saturated zone at one of said plurality of pre-selected depths, wherein said plurality of pressure regulators form air channels at said pre-selected depths through which said pressurized air injected into said saturated zone flows to remove said volatile contaminants from said saturated zone; and (g) each of said plurality of pressure regulators including:
(i) a pressure regulator housing wherein said pressure regulator is mounted within said pressure regulator housing in a fixed vertically orientated position;
(ii) a centerally located opening within said pressure regulator housing, said opening being adapted to receive the air outlet port for said pressure regulator, wherein the air outlet port for said pressure regulator is press fit within said opening and secured thereto;
(iii) a finely meshed screen positioned within the air outlet port for said pressure regulator through which said pressurized air exits said pressure regulator, said finely meshed screen preventing small particles of dirt and other contaminants from reentering said pressure regulator disrupting air flow from the pressure regulator and causing damage to said pressure regulator;
(iv) each of said pressure regulators being connected to a lower end of an associated one said plurality of air sparge flow-through packers to receive said pressurized air from said associated one of the air sparge flow-through packers and maintain said pressure regulator at said pre-selected depth within saturated zone when said associated one of the air sparge flow-through packers is inflated; and
(v) each of said pressure regulators reduces pressure of said pressurized air from approximately 20 psi to approximately 10 psi and then injects said pressurized air into the saturated zone within the soil subsurface at said pressure of approximately 10 psi.

18. The multiple point adjustable depth air sparging system of claim 17 wherein said pressure regulator housing is fabricated from schedule 80 stainless steel pipe or galvanized pipe.

19. The multiple point adjustable depth air sparging system of claim 17 wherein the air outlet port for each of said pressure regulators includes:
(a) a slotted threaded headless set screw which is screwed into a threaded opening within the air outlet port for each of said pressure regulators;
(b) a first washer positioned between said slotted threaded headless set screw and said finely meshed screen within the air outlet port for each of said pressure regulators;
(c) a second washer positioned behind said finely meshed screen within the air outlet port for each of said pressure regulators; and
(d) a spring positioned behind said second washer within the air outlet port for each of said pressure regulators.

20. The multiple point adjustable depth air sparging system of claim 12 wherein said air compressor has an air outlet port, the air outlet port of said air compressor being connected to a check valve which is a two port mechanical valve allowing for one directional fluid flow from said air compressor through said check valve to said pressure regulators within the screened portion of said well casing producing said air channels within the soil subsurface.

\* \* \* \* \*